May 22, 1934. H. T. WINNER 1,960,096
VEHICLE BODY
Filed April 7, 1931 2 Sheets-Sheet 1
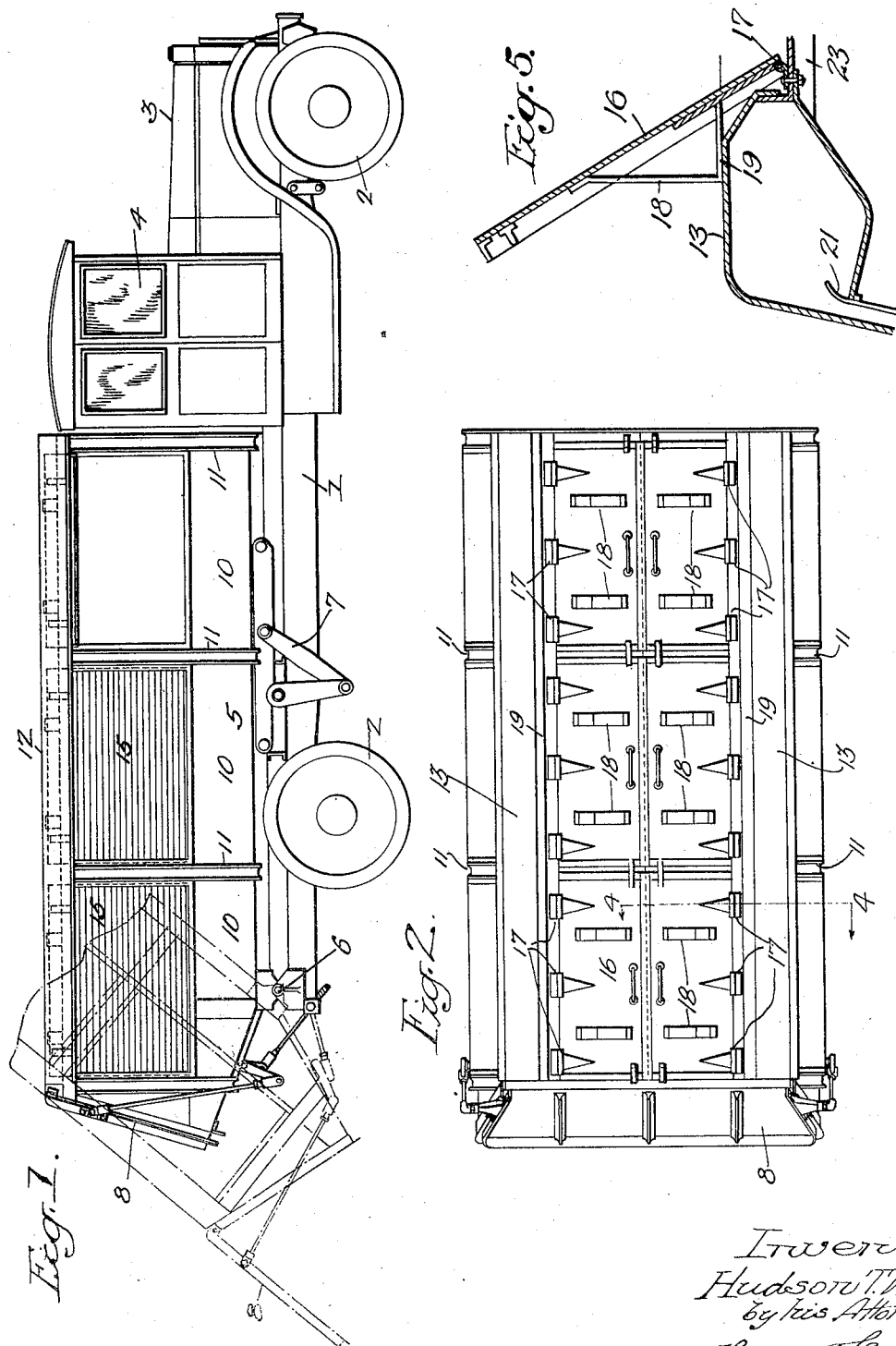
Inventor,
Hudson T. Winner
by his Attorneys
Howson & Howson May 22, 1934.  H. T. WINNER  1,960,096
VEHICLE BODY
Filed April 7, 1931  2 Sheets-Sheet 2
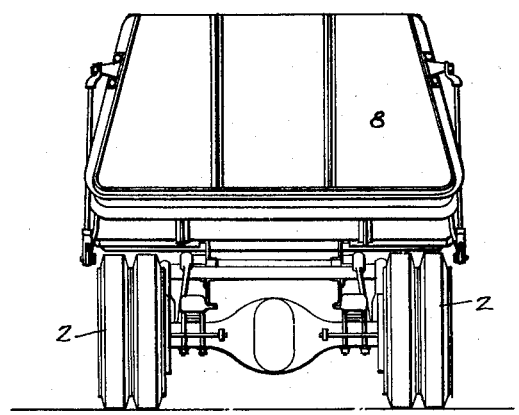
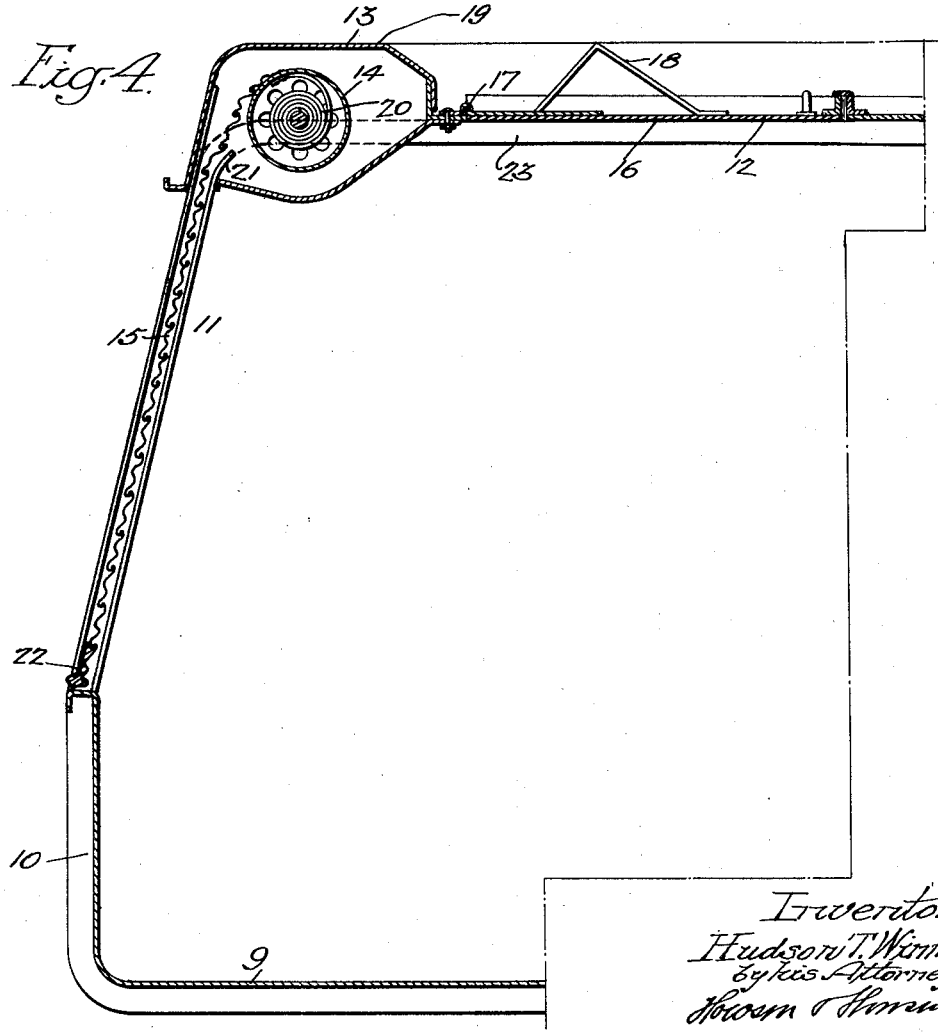

Patented May 22, 1934

1,960,096

UNITED STATES PATENT OFFICE 1,960,096

VEHICLE BODY

Hudson T. Winner, Trenton, N. J., assignor to Fitz Gibbon & Crisp, Inc., Trenton, N. J., a corporation of New Jersey Application April 7, 1931, Serial No. 528,358

4 Claims. (Cl. 296—100)

One object of my invention is to construct a truck or wagon body for use in removing and dumping ashes, garbage and other materials which are collected in cities and which are carried to a dump or other discharge point.

Another object of the invention is to so arrange the body that it can be loaded from the side at a convenient height, and to provide a series of closures for the sides of the truck body which can be closed as certain portions of the wagon are filled.

Another object of the invention is to provide roller curtains for closing the sides of the body.

A further object of the invention is to provide doors at the top which can be moved into the open position, the position being such that the doors will act as chutes to direct material into the body of the wagon.

A still further object of the invention is to so design the upper sections of the body that the rollers and the curtains will be protected, the housings for the rollers acting as supports for the doors when in the open position.

In the accompanying drawings:

Fig. 1 is a side view illustrating my improved truck body, showing two of the side openings closed and one open;

Fig. 2 is a plan view of the body showing the doors closed;

Fig. 3 is a rear end view of the body;

Fig. 4 is an enlarged sectional view showing the curtains and the housings for the curtains; and Fig. 5 is a sectional view of a portion of the roof structure showing one of the doors in the raised position.

1 is a chassis of the truck, which may be of any type desired. 2 are the wheels and 3 is the hood for the motor. 4 is the driver's compartment. 5 is the body of the truck or wagon, which is pivoted at 6 to the chassis and can be raised by any suitable elevating mechanism 7 when it is desired to dump the contents of the body. 8 is a door which closes the rear end of the body, and this door is automatically opened as the body is turned on its pivot. The above-described mechanism forms no part of the present invention and therefore is not described in detail.

The body of the truck consists of a bottom member 9, having sides 10, which are solid for a given height strengthening the body and allowing for the accommodation of material within the body. The height of the sides is comparatively low so as to allow a collector of garbage, ashes or other refuse, to readily discharge the material from small containers into the body of the truck. 11 is a series of inclined channel members which support the roof structure 12 of the body. The roof structure is shaped so as to form rigid elongated housings 13 at each side of the roof which support the heavy roof structure and, in which are located the rollers 14 for the metallic curtains 15, which are adapted to guides at the sides of the channel members 11, and when the curtain is raised it is rolled upon the rollers 14 within the enclosed housing 13, and when lowered these curtains rest upon the sides 10 of the body member 9 and enclose the body, preventing the escape of dust or material from the body of the truck when loaded. If it is desired to discharge material into the top of the body, then the sides are closed by the curtains 15 and the doors 16 are opened. These doors are pivoted at 17 to a point near the housings 13 and they are parted in the center. The doors are preferably made in sections so that certain doors can be opened while the others are closed or the entire top opened or closed as desired. On each door are brackets 18, which, when the doors are open, rest upon the surface 19 of the housings 13, the housings rigidly supporting the doors in the open position some distance from their hinges, which allows the doors to be used as chutes for material being loaded into the body, see Fig. 5. When the doors are closed and the curtains closed, the entire interior of the wagon is sealed, preventing dust or refuse from escaping while the loaded truck is being driven to a dump or other point of discharge.

When the dump is reached, the mechanism for raising the body on its pivot 6 is set in motion and the rear door is automatically opened, and when the body is elevated to a certain degree the material within the body will be discharged by gravity from the body. The body can then be lowered and the truck can be driven to another collecting point, where one curtain after another can be raised to allow material to be loaded in the body, or one or more sections of the top doors can be raised for the same purpose. The rollers are preferably heavy spring rollers of any suitable type. The springs are coil springs, as shown at 20 in Fig. 4, and the inner guide 21 extends to a point above the lower portion of the housing 13, so as to insure the proper winding of the curtains on the roller. The roller curtains are preferably provided with heavy bars 22 at their lower edges, which can be grasped by the operator when raising and closing the curtain.

It will be understood that the parts are comparatively heavy, so as to withstand the rough usage to which apparatus of this type is subjected.

In order to brace the top of the body, channel cross bars 23 extend from one housing to the other, and these cross bars also act to support the doors and the rollers within the housings.

In the drawings the side channel members are shown inclined inwards from the sides 10 of the base of the truck body to the rigid housings 13, to allow for clearance when small containers are lifted and discharged into the body of the truck. In some types of vehicles the channel members may be vertical without departing from the essential features of the invention.

By the above-described invention collections of ashes and other material can be readily made without undue effort on the part of the collectors, and the minimum amount of dust is allowed to escape when the curtains are closed after certain portions of the truck have become loaded, making the truck particularly sanitary for city ash and garbage collections.

I claim:—

1. In a truck body, the combination with a bottom member, of a roof structure, a housing formed at each side of the roof structure and extending longitudinally thereof, spaced transverse members connected between the lower adjacent edges of said housings so that the latter project a substantial distance above the plane of said transverse members, and doors hinged adjacent the lower inner edges of each of said housings for closing the spaces between the spaced transverse members and housings, said doors being arranged to open outward of the body and be supported in the latter position by the housings to be used as chutes for material loaded into said body.

2. In a truck body, the combination with a bottom member, of a roof structure, a housing formed at each side of the roof structure and extending longitudinally thereof, spaced transverse members connected between the lower adjacent edges of said housings so that the latter project a substantial distance above the plane of said transverse members, doors hinged adjacent the lower inner edges of each of said housings for closing the spaces between the spaced transverse members and housings, and brackets mounted on the exterior of each of said doors, said doors being arranged to open outward of the body and be supported in the latter position by the brackets, to be used as chutes for material loaded into said body.

3. In a truck body, the combination with a bottom member, a roof structure spaced therefrom and curtains operable to close the space between said bottom and roof, of a housing for supporting said curtains formed at each side of the roof structure and extending longitudinally thereof, spaced transverse members connected between the lower adjacent edges of said housings so that the latter project a substantial distance above the plane of said transverse members, and doors hinged adjacent the lower inner edges of each of said housings for closing the spaces between the spaced transverse members and housings, said doors being arranged to open outward of the body and be supported in the latter position by the housings to be used as chutes for material loaded into said body.

4. In a truck body, the combination with a bottom member, a roof structure spaced therefrom and curtains operable to close the space between said bottom and roof, of a housing for supporting said curtains formed at each side of the roof structure and extending longitudinally thereof, spaced transverse members connected between the lower adjacent edges of said housing so that the latter project a substantial distance above the plane of said transverse members, doors hinged adjacent the lower inner edges of each of said housings for closing the spaces between the spaced transverse members and housings, and brackets mounted on the exterior of each of said doors, said doors being arranged to open outward of the body and be supported in the latter position by the brackets to be used as chutes for material loaded into said body.

HUDSON T. WINNER.